No. 711,143. Patented Oct. 14, 1902.
W. W. WOTHERSPOON.
MONOLINE MACHINE.
(Application filed Sept. 13, 1901.)
(No Model.) 8 Sheets—Sheet 1.

Fig. 1.

WITNESSES:
H. M. Seamans
C. P. Robinson

INVENTOR
W. W. Wotherspoon
BY
Duell, Megrath & Mafield
ATTORNEYS.

No. 711,143. Patented Oct. 14, 1902.
W. W. WOTHERSPOON.
MONOLINE MACHINE.
(Application filed Sept. 13, 1901.)
(No Model.) 8 Sheets—Sheet 2.

No. 711,143.

W. W. WOTHERSPOON.
MONOLINE MACHINE.
(Application filed Sept. 13, 1901.)

Patented Oct. 14, 1902.

(No Model.)

WITNESSES:

INVENTOR

BY

ATTORNEYS.

No. 711,143. Patented Oct. 14, 1902.
W. W. WOTHERSPOON.
MONOLINE MACHINE.
(Application filed Sept. 13, 1901.)
(No Model.) 8 Sheets—Sheet 6.

No. 711,143. Patented Oct. 14, 1902.
W. W. WOTHERSPOON.
MONOLINE MACHINE.
(Application filed Sept. 13, 1901.)

(No Model.) 8 Sheets—Sheet 7.

No. 711,143. Patented Oct. 14, 1902.
W. W. WOTHERSPOON.
MONOLINE MACHINE.
(Application filed Sept. 13, 1901.)
(No Model.) 8 Sheets—Sheet 8.

WITNESSES:
H. M. Seamans
C. P. Robinson

INVENTOR
W. W. Wotherspoon
BY
Duell, Megrath & Warfield
ATTORNEYS.

United States Patent Office.

WILLIAM WALLACE WOTHERSPOON, OF NEW YORK, N. Y.

MONOLINE-MACHINE.

SPECIFICATION forming part of Letters Patent No. 711,143, dated October 14, 1902.

Application filed September 13, 1901. Serial No. 75,253. (No model.)

*To all whom it may concern:*

Be it known that I, WILLIAM WALLACE WOTHERSPOON, residing at New York, in the county of New York and State of New York, have invented certain new and useful Improvements in "Monoline-Machines," of which the following is a full, clear, and exact description, such as will enable others skilled in the art to which it appertains to make and use the same.

This invention relates to that class of machines for producing a line of type known in the art as the monoline-machines, typical illustrations of such machines being disclosed in United States Letters Patent No. 506,198, issued October 3, 1893, and No. 605,141, issued June 7, 1898, to W. S. Scudder; No. 622,989, issued April 11, 1899, to W. E. Bertram, and No. 650,296, issued May 22, 1900, to S. Bradley. In this type of machine, as shown by these patents, the matrix-bars are divided into eight different species, each bar having a certain number of characters thereon. Each species of matrix-bars and what is known as the "space-bars" are stored in separate chambers in a magazine and are selected and delivered from this magazine by the manipulation of a keyboard and assembled in a line. The line-carriage then engages the line of assembled bars and conveys them to a justifying mechanism, by which the space-bars are expanded to justify the line, after which the line-carriage moves to convey the line to the molding-point, where the printing-bar is cast. The mold is then moved to an ejector, by which the printing-bar is ejected from the mold between a trimming-die and the line deposited in the galley. The line held by the carriage at the casting-point is then released and depressed by a depressing mechanism. The carriage is then moved back to a distributer, which lifts the matrix and space bars out of the carriage to a point where they are distributed in proper order to the separate compartments in the magazine. The line-carriage then moves to its initial starting-point, ready to hold another line of matrices which have been assembled while the carriage has been moving to the casting-point.

The object of the present invention is to simplify and improve the machines shown and described in said patents and to produce a machine that will cast a line of type of varying lengths. The driving mechanism, the magazine, the keyboard, and the selecting, delivering, and assembling mechanism are substantially the same as those shown in the said prior patents. The chief parts that have been improved and are embodied in this new machine are what are known as the "carriage," the "alining-bar," the "justifier," the "melting-pot" and "mold," and the "distributer." Other improvements have been made which will appear from the following description and will be more particularly pointed out in the claims.

Having now stated generally the nature and objects of the improvements, the machine will now be described in detail.

For a full understanding of the improvements reference must be had to the accompanying drawings, forming a part of this specification, in which similar symbols of reference indicate the same parts in the different views of the drawings.

Referring to the drawings, Fig. 6 is a section through the melting-pot, the mold and anvil being taken on the line 6, Fig. 1, the carriage being in position in the anvil in front of the mold. Fig. 6$^a$ is a detail view of the cams and rollers for moving the melting-pot.

The part lettered A on the drawings represents the bed of the machine. B is the keyboard. C is the magazine in which are stored the different species of matrix-bars and the space-bars. D is the main driving-shaft. E represents the chain of gears through which the main driving-shaft is driven. All these parts are old and well known and described in prior patents and need no further description here.

The number of matrix-bars and the number of characters are the same as those used in the Scudder machines. These bars are, however, longer than Scudder's and have an extra notch at the top, as shown by Bertram; but there are no holes in these bars, as shown in the said Bertram matrix, as these holes are not necessary for use in the improved machine. The hooks on the matrices are of the shape shown in the Bradley patent. The space-bars are the same as shown in the Scudder or Bertram patents. These bars are made in a manner well known in the art.

For convenience in describing hereinafter the operation of the improvements the matrix-bars and space-bars will now be briefly described.

1 represents a matrix-bar, and $1^a$ represents the characters on the bar. $1^b$ represents the alining-notches on the opposite edge.

$1^c$ is the extra notch referred to, and $1^d$ is the hook by which the matrix-bars are lifted and distributed after the line of type has been cast, this hook having a flat or straight end or top $1^e$ to be used in the Bradley type of distributer.

$1^f$ is the square shoulder on the top of the bars, against which the depressor strikes to depress the bars after casting.

2 represents the space-bar, having the lug $2^a$, by which this bar is held in the groove of the anvil when the line of bars is being justified and also when these bars are operated upon by the depressor to lower them before distribution. The upper part of the space-bar also has a square shoulder, against which the depressor operates.

Figure 10:
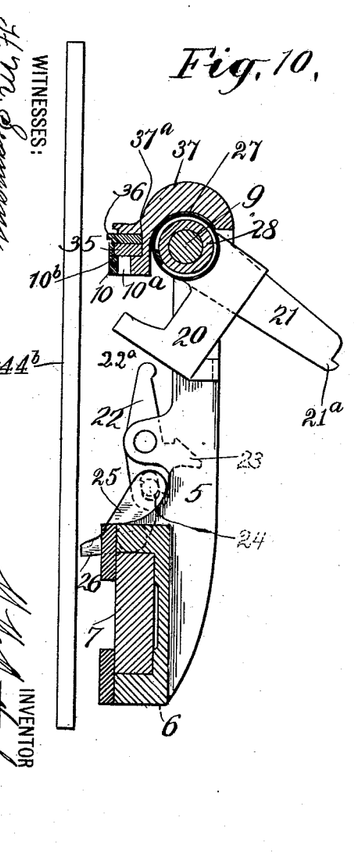
Fig. 10 is a section of the carriage on line 10 10, Fig. 11, showing the position of the parts when the locking-lever is released.
Figure 11:
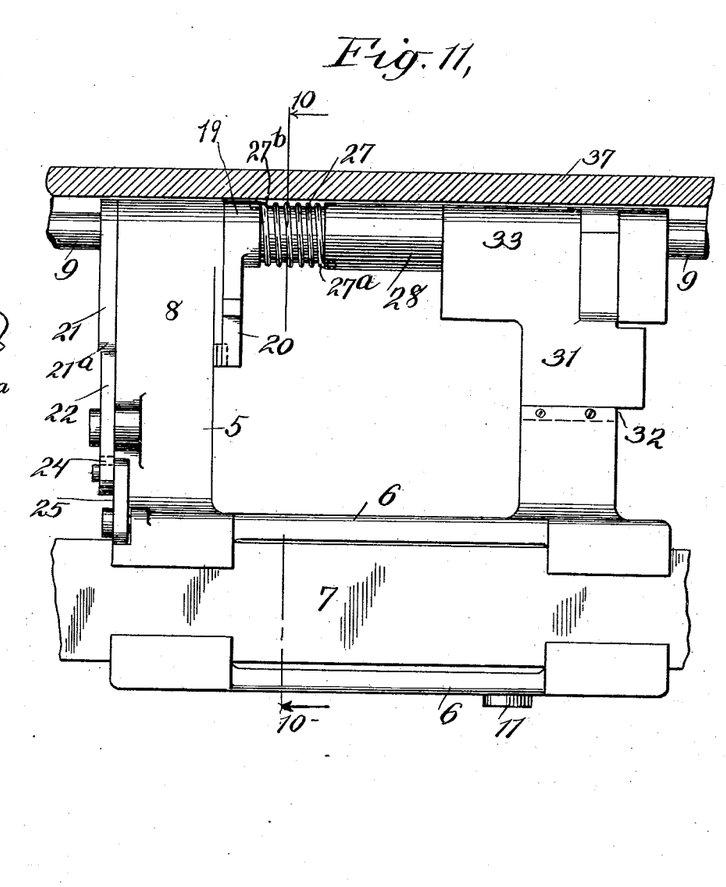
Fig. 11 is a rear view of the carriage.
Figures 12, 13, 14:
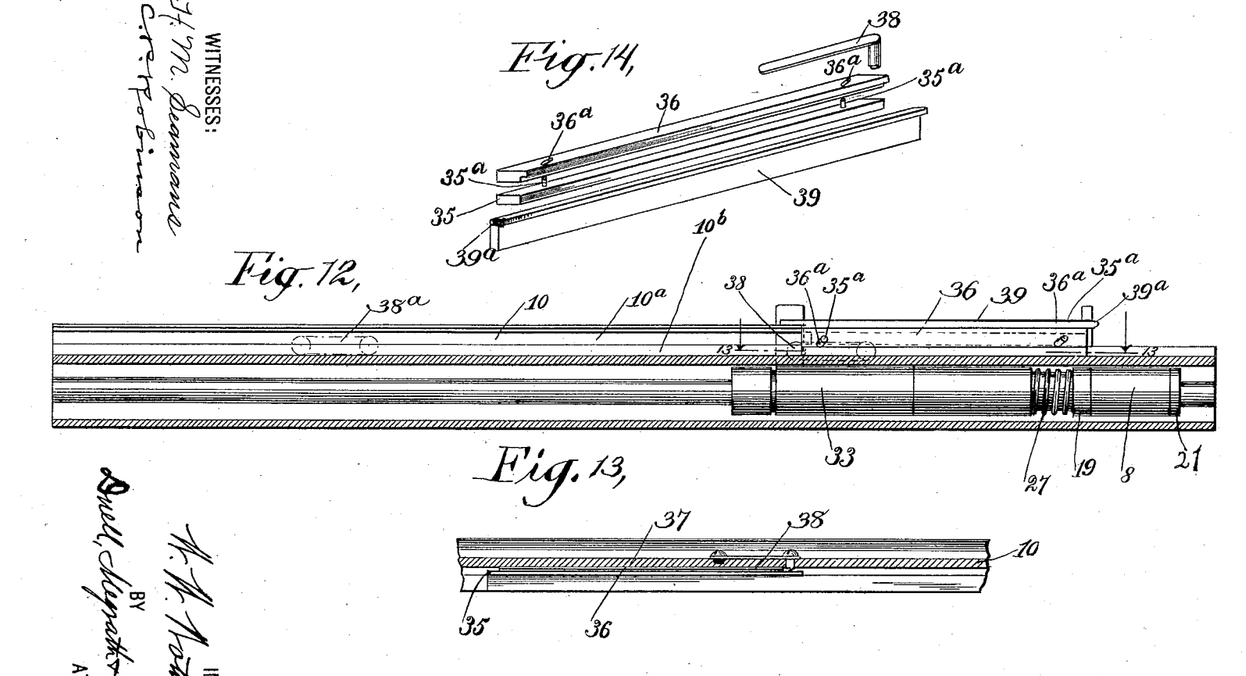
Fig. 12 is a top view of the carriage and the alining-bar rail and alining-bar, the cap or casing under which the carriage travels being shown in section.
Fig. 13 is a section on line 13 13, Fig. 12.
Fig. 14 is a perspective detail of the stationary alining-bar, the slide, the movable alining-bar, and the spring-detent for operating the movable alining-bar.

*The line-carriage.*—The principle of the old type of carriage is embodied in the present machine; but my carriage is much simpler and stronger than the prior carriages. The center of gravity of my carriage is where it should be. The locking and unlocking device is much simpler, and both the unlocking and releasing of the line is performed by one movement of the depressor. The jaw or lug which coöperates with the locking-wing on the carriage between which the line of bars are held is so attached to the carriage that the complicated mechanism heretofore used for operating this movable jaw is dispensed with. This jaw is also so fitted to the carriage that another jaw of different length and design may be readily substituted, and different lengths of line can be assembled without any other change in the machine. The body or main portion of the carriage is marked 5 on the drawings. It comprises a casting, the lower part 6 of which is mounted to travel on the guide-rail 7, attached to and parallel with the front part of the machine. The upper part 8 of the carriage is sleeved on the guide rail or rod 9, which is attached to and extends along the front of the machine parallel to the alining-bar rail 10. To the under side of the carriage at 11 is pivoted a spring-link 12, to which is pivoted at 13 lever 14, by which the carriage is moved from one end of the machine to the other. This lever is pivoted to the frame of the machine at 15, Fig. 2 and dotted lines Fig. 1, having on its inner end a roller 16, which moves in a cam-groove 17 in the cam 18, attached to the main driving-shaft D. At the upper part of the carriage and encircling the rod 9 is a hub 19, to which is attached a plate 20, termed a "wing," and which swings up to bear against the right of the assembled line of matrix and space bars to hold them in position. This hub 19 is extended to the right as a sleeve 18 of the carriage and has on its end projecting beyond the right of the carriage a lever 21, by which the hub is turned or rocked to throw the wing in position to hold the matrix and space bars. Pivoted to the side of the carriage is a lever 22, having a hook 23 thereon and a slot 24 in its lower end. Pivoted to the carriage below the lever 22 is a lever 25, having a finger 26 projecting toward the machine and in the space between the front plate of the machine and the rear of the carriage. The lever 21 has on its lower end an offset or detent $21^a$, which is engaged by the hook 23, which holds the lever in locked position. Encircling the rod 9 is a tension-spring 27, one end $27^a$ of which is fastened to a sleeve 28, surrounding the rod, and the other end $27^b$ is fastened to the hub 19. This spring throws the lever 21 and the wing connected thereto away from the machine to the position shown in Fig. 10, when the lever 21 is released from engagement with the hook 23, this being done by means of the lower or under side 29 of the depressor when the depressor is lowered to depress the bars after they are cast in the manner to be hereinafter described. The jaw 31 is fitted to the carriage by tongued and grooved joint 32, the upper part 33 being sleeved on the rod 9. By this tongued and grooved connection the jaw may be readily removed from the carriage and slipped off the rod and another jaw of different design and length may be substituted, so that a different length of line of bars may be assembled in the carriage.

Projecting upward from the rear part of the jaw 31 is a pin 34, which moves in a longitudinal slot $10^a$ of the alining-bar rail 10 and which is connected to the slide 35, which operates the traveling alining-bar. At this point it may be advisable to describe in detail the alining-bar mechanism.

Figures 6, 6A:
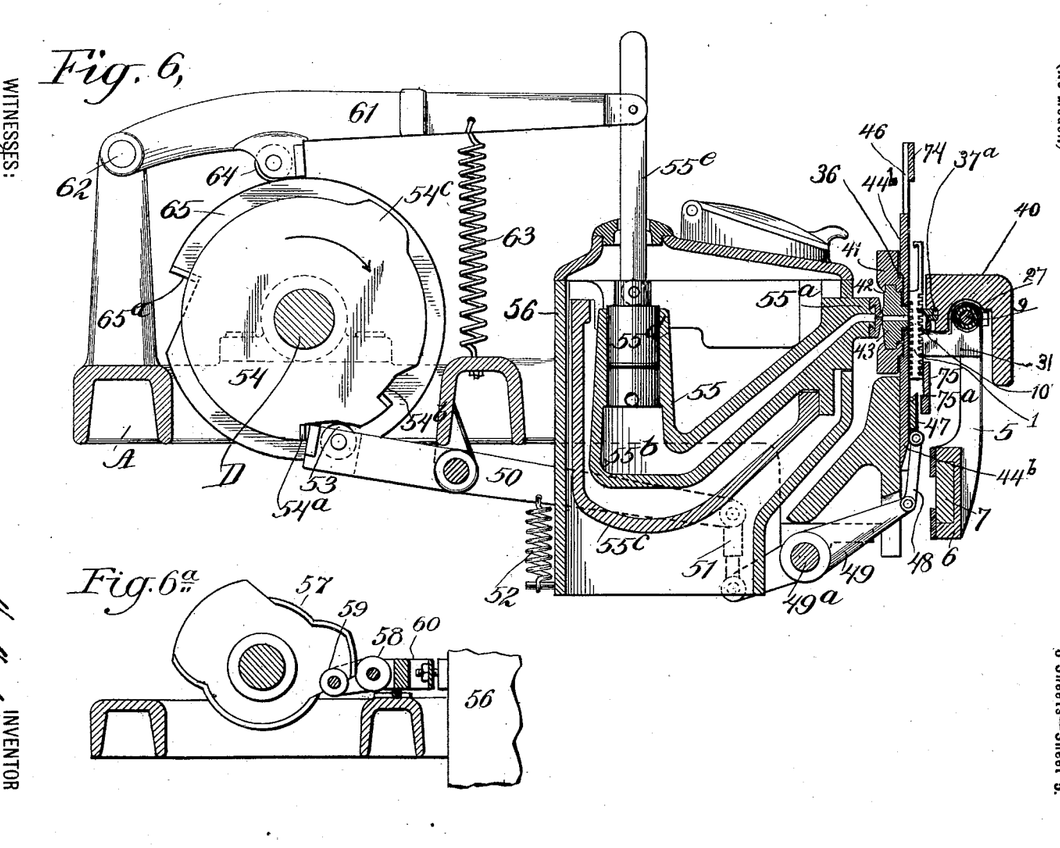
Figure 7:
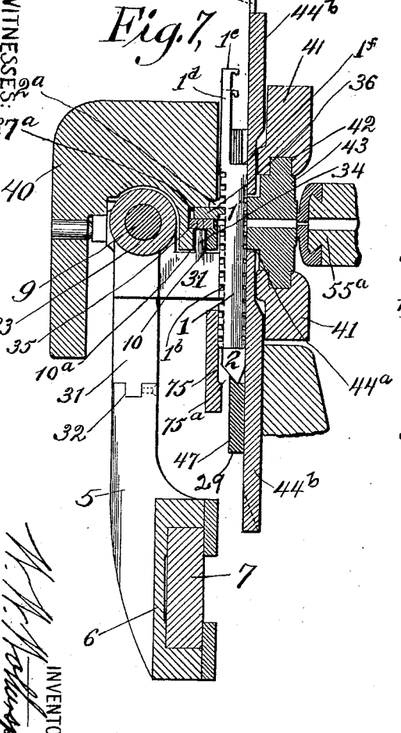
Fig. 7 is an enlarged sectional view of the carriage, anvil, and mold in the same position as shown in Fig. 6, but looking in the opposite direction.
Figure 8:
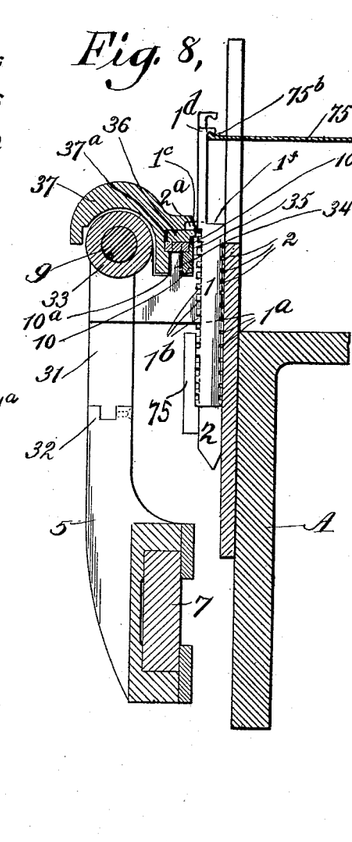
Fig. 8 is a section of the carriage opposite the distributer looking toward the left of the machine and showing the position of the parts after the bar of type has been cast and the matrix-bars depressed to their lowest position before distribution.
Figure 9:
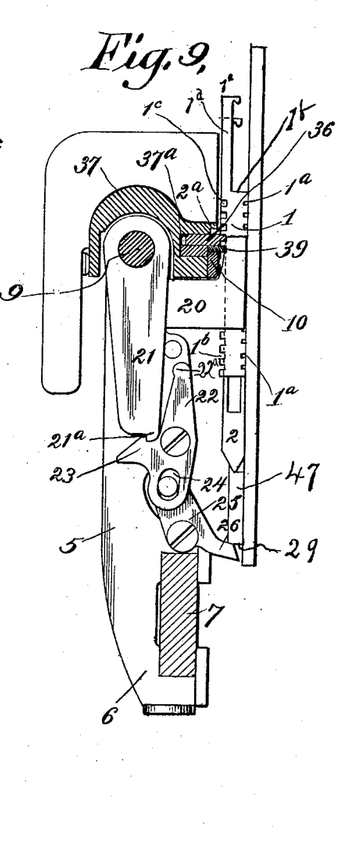
Fig. 9 is a side elevation of the carriage looking toward the left of the machine and showing the position of the parts when the carriage is ready to move the assembled line of matrix and space bars to the justifying mechanism opposite the molding-point.

There are two alining-bars—a stationary alining-bar 39, on which are assembled and held the matrix-bars and space-bars by means of their alining-notches, and the traveling alining-bar 36, which takes in the notches of said bars above the notches by which they are held by the stationary bar. The means for operating the traveling alining-bar is much simplified in the present invention. As has been before stated, 10 is the alining-bar rail, having a longitudinal slot $10^a$, in which moves the pin 34, connected to the slide 35. The rail 10 is provided with grooves $10^b$, in which travels the slide 35. Projecting from the upper side of this slide are two pins $35^a$, which enter inclined slots $36^a$ in the traveling alining-bar 36. The slide and traveling alining-bar are housed and move in a recess $37^a$, cut in the rear of a protected cap or cover 37, extending along the front of the machine parallel to and above the rod 9, said cover extending to and connecting with the anvil, to be hereinafter described, and the recess continues into the anvil, as may be seen by referring to Figs. 6 and 7 of the drawings. Attached to the cap 37 above and projecting in the path of the line of travel of the bar 36 is a spring-detent 38, there being a similar detent $38^a$ projecting through the anvil. At the right of the rail opposite the magazine and at the assembling-point of the matrix-bars is a stationary alining-bar 39, having a pointed and beveled end $39^a$ entering the assembly-box (not shown) to facilitate the engagement of the matrix-bar notches with the stationary alining-bar in the manner well known in the art.

The alining-bar operates as follows: When the desired matrix-bars and space-bars have been selected and pushed onto the stationary alining-bar 39, the line of bars are held in the carrier between the jaw 31 and the wing 20, the latter having been swung up into position by moving the lever 21 toward the machine, the said lever being held in place by the hook 23. The carriage is then moved toward the left by the lever 14. The slide 35 being connected to the jaw 31 of the carriage by the pin 34 moves to the left with the carriage, carrying with it the traveling alining-bar 36. When the end of this bar strikes the spring-detent 38, its travel is momentarily arrested, and as the slide continues to move with the carriage the traveling alining-bar is forced out by the pins $35^a$ and inclined slot 36 into the proper notches in the line of matrix-bars. As the carriage continues to travel, the detent is raised, being spring-pressed, and the traveling bar then moves under the detent, carrying with it the line of type. The carrier continues to travel to the left until it stops in front of the mold and casting-pot, at which point the line of type is justified.

Heretofore in the class of machines previously referred to the justification of the line took place before it was delivered to the casting-point and independent mechanism was required to perform the justification. In this machine the point of justification has been changed to a point in front of the casting-pot, and the justifier is then connected to the same mechanism that operates the depressor, with some slight changes, thus dispensing with the independent justifying mechanism. After the line is brought in front of the mold it is pressed against the anvil and alined up by the melting-pot moving forward against the mold. The melting-pot is then moved backward a slight distance and the first justification of the line takes place. The melting-pot is then forced forward a second time to aline the bars that may have been displaced by the first justification, and the second justification takes place. If necessary, a third justification can be performed by slight addition to the cams which operate the casting or justifying mechanism. The mechanism for performing the operation of justifying will now be described.

40 is an anvil, hereinbefore referred to, located in front of the mold.

41 is a mold-carrying frame having a longitudinal slot 42, in which travels the mold 43. This frame is pivoted at 44, Fig. 1. The mold has a nozzle, which projects through an opening $44^a$ in a shield or plate $44^b$, secured to the front of the machine. In the front of this plate are two parallel vertical channels or grooves 45, in which slide the bars 46. Attached to the lower ends of these bars longitudinally across the front of the shield is the justifying-shoe 47. This shoe is connected by a link 48 to a lever 49, pivoted at $49^a$ to the underside of the bed of the machine. This lever is connected at its rear end by a spring-link 51 to the forward end of another lever 50, Fig. 6. The forward end of this lever 50 is pulled down by a spiral spring 52. The rear end of said lever carries a roller 53, which moves on the rim of a cam-wheel 54, having cam depressions $54^a$ and $54^b$ and cam projections $54^c$ on the periphery thereof. Only so much of the mechanism for operating the casting-pot as aids in the justification will now be described. The other parts will be described hereinafter. The casting-pot 55 is supported in a jacket or frame 56, through which the nozzle or spout $55^a$ extends. This jacket is mounted to reciprocate to and from the mold 43 by the cam 57, Fig. 1, operating on the rollers 58 and 59, connected to the sliding cross-head 60, attached to the jacket in the well-known manner. The line of matrix and space bars being now between the mold and anvil, the cam 57 forces the casting-pot forward, the spout of which forces the mold against the line of bars, which are forced back against the anvil and the bars are pressed into a vertical line. The pot is then drawn backward away from the mold, and just at this point the roller 53, which has been resting on the periphery of the cam 54, is drawn down into the cam-recess 54ª by the spring 52, and the outer end of the lever 49 is raised and through the link 48 forces the justifying-shoe 47 against the lower end of the spacer-bars and causes them to expand and justify the line of matrix-bars. The roller 53 then rides out of the depression 54ª onto the surface of the cam, raising the outer end of the lever 50, which through the links and lever 49 pulls down the justifying-shoe. The casting-pot is then forced a second time against the mold 43, straightening up any of the bars that may have been disarranged by the first justification. The roller then drops into the cam-recess 54ᵇ and a second time permits the spring to pull down the lever 50 and again raise the justifying-shoe to a second time justify the bars. The pot now is held close against the mold in position to cast the line of type.

*Casting-pot.*—The casting-pot 55, above referred to, is made with rounded or curved corners 55ᵇ, so that the metal will flow easily and freely toward the nozzle. A casing 55ᶜ surrounds the pot, so that the flame from the burner placed under the pot will not impinge directly upon the bottom of the pot, but the metal in the casting-pot will be heated evenly, so that it will be more readily forced to the mold. Reciprocating in the top of the pot is a piston or plunger 55ᵈ, connected by rod 55ᵉ to the lever 61, pivoted at 62 to the frame of the machine, a spring 63 being attached to the lever and the bed of the machine, which tends to pull down that end of the lever to which the rod 55ᵉ is attached. On this lever is a roller 64, which rides on the face of the cam-wheel 65, which has a cam depression 65ª cut therein to permit the roller 64 to drop therein and the lever pulled down by the spring 63. The justification having taken place as above described and the spout of the casting-pot being forced against the mold 43 and the metal being in the casting-pot in a liquid condition, the cam 65 rotates until the depression 65ª comes underneath the roller 64, when the lever is suddenly pulled down by the spring and the plunger 55ª is forced down and drives the molten metal through the spout into the mold and on the matrix-bars, where the type is cast. The cam 65 then raises the lever and plunger and permits the metal to flow back into the casting-pot. At this point of the operation the pot is also pulled away from the mold by the cam 57 and the mold moves away from the line of matrix-bars, carrying the cast line with it. The mold is then moved toward the left in its guide 41 by the lever 66, connected to the mold by a link 67, the lever being pivoted at 68 and operated by the cam 69. The mold stops in front of a trimming-die 70, through which it is forced by the ejector 71 onto the galley 72, the ejector being operated by the cam 73 and the lever connection 74. While the cast line is moving toward the left in the mold the depressor is brought into play to force the heels or lower ends of the matrix-bars so that they may be properly distributed. As before stated, the depressor is operated by the same system of mechanism that operates the justifier.

Attached horizontally across the upper ends of the two vertically-reciprocating slide-bars 46 is the depressor 74. This depressor is pulled down by and when the cam projection 54ᶜ comes against the roller 53—that is to say, this projection forces the roller down, and the system of levers and links 50 and 51, 49 and 48 operates in an opposite direction than when moved to justify the type. When the depressor is pulled down, the lower or under side 29 of the justifier 47 strikes the finger 26 of the lever 25, pressing down said finger and unlocking the lever 21, so that the wing 20 will be swung out under the tension of the spring to release the line of bars. If the tension of the spring 27 is not sufficient to throw the lever 21 out by the parts binding or for other reasons, the upper end 22ª of the lever 22 will strike the lever 21 as the depressor moves down and the lever 21 will be positively thrown out and the wing 20 be disengaged from the line of type. The line of type being now released, as the depressor descends it strikes against the upper squared portion of the space-bars, the other part of said bar being held by its lug 2ª in the recess in the anvil and elongates the space-bars and further loosens the matrix-bars, so that they may be pulled down by the depressor until their lower ends and heels rest on the ledge or shoulder 75ª of the shoe 75. Before these matrix-bars, however, can be pulled down by the depressor the traveling alining-bar must be moved back out of engagement with the alining-notches in said bar. This is done soon after the casting of the line in the following manner: After the casting has taken place the carriage is moved to the right, carrying with it the traveling alining-bar. When the end of this bar strikes the spring-detent 38ª, projecting in its path through the anvil, it momentarily arrests the longitudinal movement of the bar and causes it to move backward from the matrix-bar by the inclined slots 36ª riding on the pins 35ª in a direction opposite from that which it traveled when the carriage started from in front of the assembling-point at the right of the machine. After the depressor has pushed the bars down in line it is raised by the influence of a spring 52 when the roller 53 rides beyond the projection 54ᶜ. The carriage is then moved to the distributing-point, where the matrix-bars and the alining-bars are lifted and conveyed and distributed to their proper compartments in the magazine.

The distributer that is used in this machine consists of a series of nine plates 75$^c$, one for each species of matrix-bar and one for the space-bars. Each of these plates has a longitudinal slot 75$^d$, said slots being of different lengths, the front end of each plate being provided with a bead 75$^e$, onto which the hooked upper end of the bars are pushed or swung. These plates are moved in longitudinally-parallel grooves in a vertically-reciprocating slide or cross-head 76, movable in a pair of vertical guides 77, attached to the bed of the machine. This cross-head is attached to the lever 79 by links 78, the upper ends of which move in vertical slots 77$^a$ in the vertical guides 77. The lever 79, which is pivoted at 80, is provided with a roller 81, which operates against the periphery of the cam 82. The cross-head carrying the plates is lowered by gravity and raised by the cam 82. If, however, it is found that gravity cannot be depended upon to lower the cross-head, a spring may be attached to the lever to pull it down, or the roller of the lever may run in a cam-groove in the cam 88 to both lower and raise the cross-head.

83 is a plate or finger passing through the slots in the distributer-plates, the cross-section of this finger being about the size and shape of the slot in the lower plate of the series.

84 is a lever pivoted to the bed of the machine at 85 and connected to the finger by a spring-link 86. On the lower arm of this lever is a roller 87, which is acted upon by the cam 88 to raise the end of the said lever.

89 is a spring connected to the lever and tends to force the upper end thereof down and out.

Figure 1:
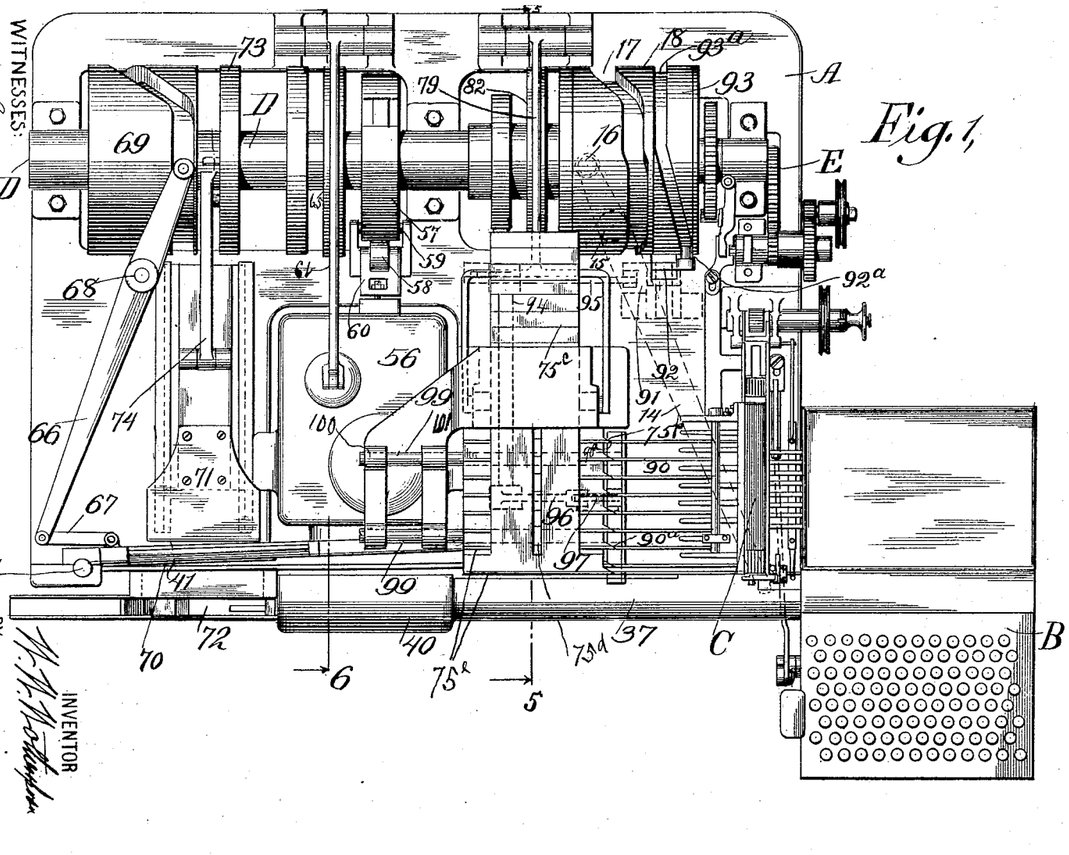
Figure 1 is a plan view of the machine.
Figure 2:
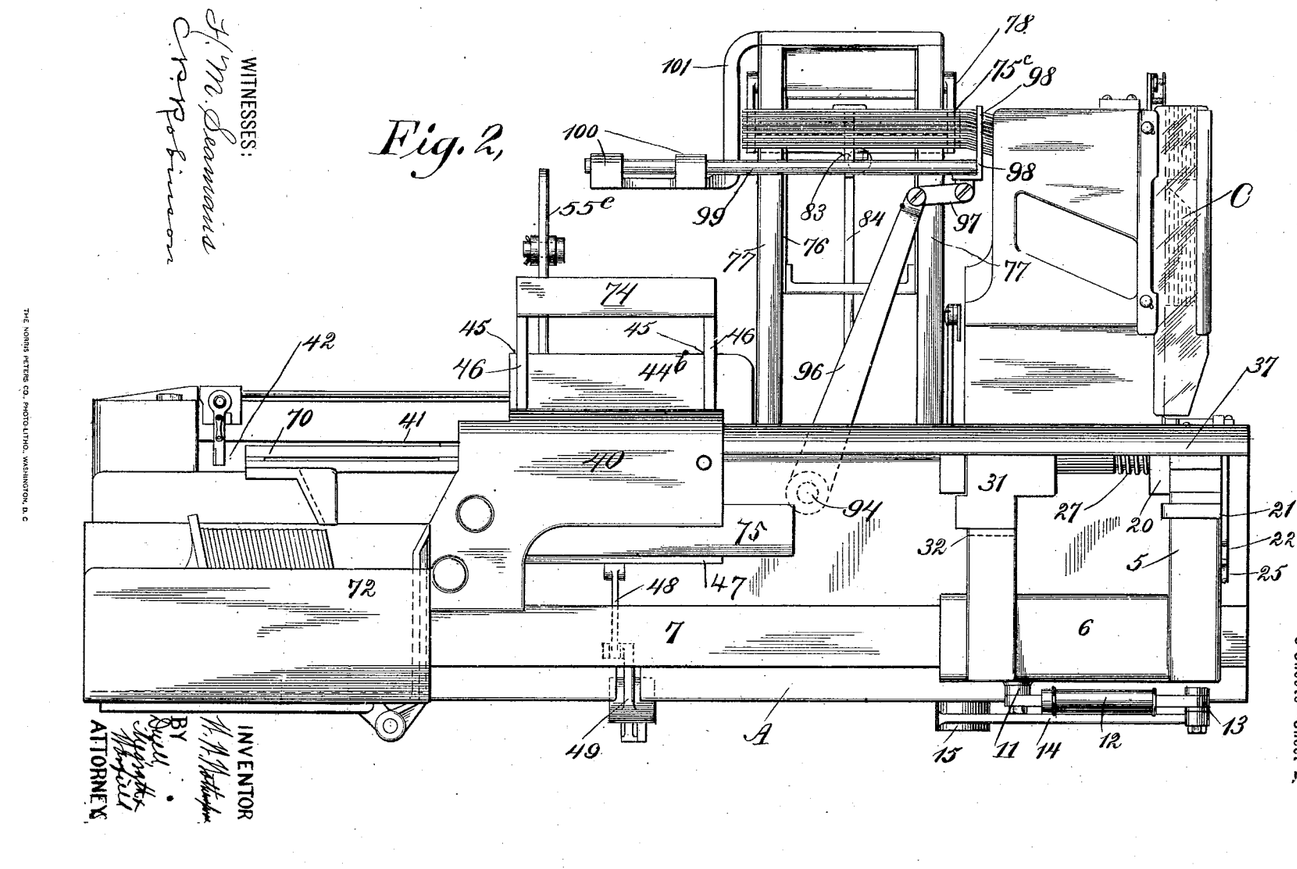
Fig. 2 is a front elevation, the keyboard being omitted.
Figure 3:
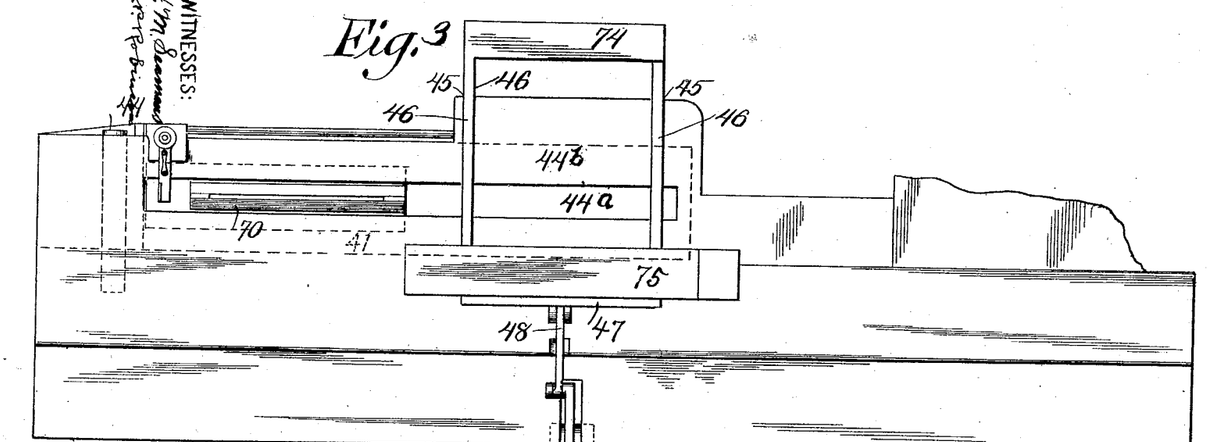
Fig. 3 is a front elevation of a part of the machine with the carriage and anvil removed to more clearly show the depressor and the justifier.
Figure 4:
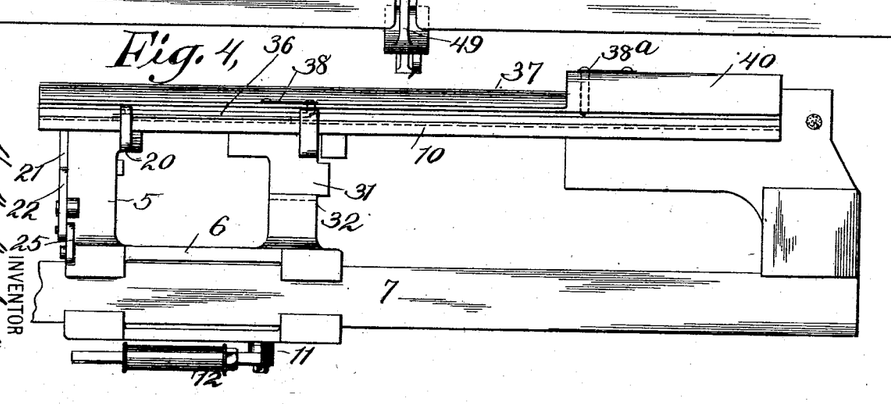
Fig. 4 is a rear view of a part of the machine, showing a rear view of the carriage and anvil.
Figure 5:
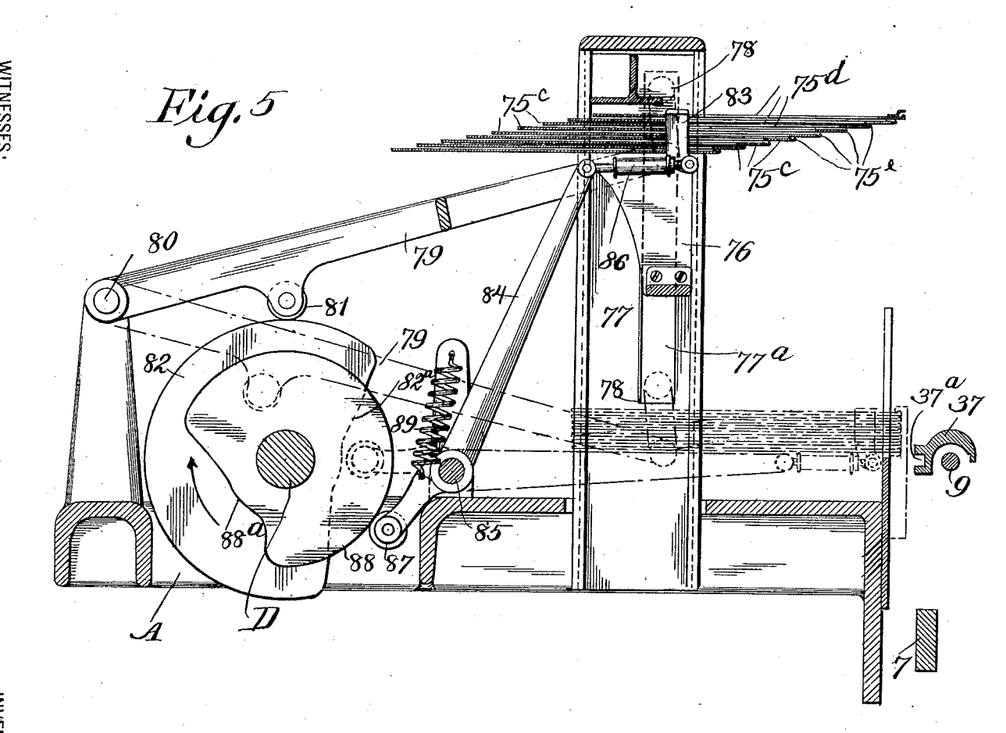
Fig. 5 is a vertical section on the line 5, Fig. 1, showing the distributer mechanism.

The distributer-plates are shown in Fig. 5 in their raised positions. They are lowered as follows: When the cams 82 and 88 rotate until the cut-away portions 82$^a$ and 88$^a$ come in contact with the rollers 81 and 87, respectively, the cross-head carrying the plates will descend in the guides by gravity and at the same time the lever 84 is pulled down under the influence of the spring 89 and moves forward, carrying with it the finger 83, which forces forward in succession the plates, beginning with the lower one, so that the outer ends of all the plates will be in line. These plates are shown in their lowered position by dotted lines on Fig. 5. When the plates are in this position, the carriage as it moves to the right carries the matrix and space-bar hook onto the beads on their appropriate plates. The plates are then raised by the lever 79, pulled back by the lever 84, when the parts of the cams 83 and 88 come in contact with the roller 81 and 87. The distributer-plates move first vertically and then in the arc of a circle from their lowered position to their raised position, carrying with them the matrix and space-bars. When the plates are in their upper positions, the beads, which are beveled at the ends 75$^f$, Fig. 1, mate with the beveled ends 90$^a$ of the guide-rods 90 in the different compartments of the magazine to where the bars are delivered. The matrix and space-bars are pushed over the beads to the guide-rods by the following mechanism:

Pivoted to the bed of the machine at 91, dotted lines, Fig. 1, is a lever 92, one end of which carries the roller 92$^a$, moving in the slot 93$^a$ of the cam 93 of the drive-shaft.

94 is a rock-shaft pivoted to the bed of the machine and connected by a link 95 to the lever 92. On the other or outer end of this rock-shaft is a lever 96, connected by link 97 to the pusher-plate 98, extending below and transverse to the direction of the beads on the distributer-plates. The pusher-plate is carried by two horizontal guide-rods 99, which are supported and slide backward and forward in perforated lugs 100 on the plate 101, which is fastened to the vertical guide 77. While the distributer-plates carrying the bars are being raised to their vertical position, this pusher-plate is at the extreme left of its throw. When the plates are raised to the highest position, the pusher-plate is then moved to the right by the roller 92$^a$ moving in the cam-groove 93, through the system of levers and links above described, and the bars are by this pusher moved or pushed along the beads 75$^e$ to the guide-rods 90, and the said bars are then deposited in their proper compartments in the magazine. After the distributer has raised the bars out of the carriage the said carriage continues to move to the right, and as the wing 20 is down and away from the machine in the position shown in Fig. 10 it will pass beyond the line of bars that have been assembled while the carriage was traveling to and from the casting position.

It is believed that the operation of the machine has been sufficiently described to inform one skilled in the art as to the manner of constructing and operating the machine, and no further description is necessary.

Having now fully described my invention, what I claim as new, and desire to secure by Letters Patent, is—

1. In a traveling line-carriage of a monoline-machine, the combination of the main frame of the carriage adapted to travel along a guide-rail, a jaw mounted on said frame and stationary with reference to the frame, and a movable wing connected to said frame and adapted to hold a line of matrix-bars in the carriage between the jaw and wing, said frame adapted to have only a longitudinal movement in reference to said guide-rail.

2. In a traveling line-carriage of a monoline-machine, the combination of the main frame of the carriage adapted to travel along a guide-rail, an interchangeable or removable jaw attached to and rigidly connected to said frame, a movable wing connected to the frame and adapted to hold a line of matrix-bars in the carriage between the jaw and wing.

3. In a traveling line-carriage of a monoline-machine, the combination of the main frame of the carriage, a jaw connected to the carriage, stationary with reference to the carriage and a wing mounted in said carriage adapted to rock or swing up against the line of matrix-bars in the carriage, to hold the line in the carriage between the stationary jaw and wing, said frame adapted to have only a longitudinal movement.

4. In a traveling line-carriage of a monoline-machine, the combination of the main frame of the carriage, a jaw stationary with reference to the carriage, a swinging wing sleeved in the carriage, a guide-rod passing through the carriage and through the sleeve of the wing, and a spring encircling the guide-rod and adapted to swing the wing out of engagement with the line of matrix-bars.

5. In a traveling line-carriage of a monoline-machine, the combination of the main frame of the carriage adapted to travel along a guide-rail, a jaw forming part of the carriage and stationary with reference to the carriage, a movable wing sleeved in the carriage, an arm or lever connected to the wing adapted to throw the wing into engagement with the line of matrix-bars in the carriage, and means adapted to throw the wing out of engagement with the line of matrix-bars when the lever is raised.

6. In a traveling line-carriage of a monoline-machine, the combination of the main frame of the carriage adapted to travel on a guide-rail, a jaw connected to and forming part of the carriage and stationary with reference to the carriage, a movable wing connected to the carriage, a spring connected to the wing and adapted to throw it out of engagement with the line of matrix-bars in the carriage, a lever connected to the swinging wing to throw the wing into engagement with the line of matrix-bars, a hook or latch adapted to hold the lever in locked position.

7. In a traveling line-carriage of a monoline-machine, the combination of the main frame of the carriage adapted to travel on a guide-rail, a stationary jaw connected to and forming part of the carriage, a movable wing connected to the carriage, a spring connected to the wing and adapted to throw it out of engagement with the line of matrix-bars in the carriage, a lever connected to the swinging wing to throw the wing into engagement with the line of matrix-bars, a hook or latch adapted to hold the lever in locked position, and a trip-lever connected to the catch or hook to operate the same to release the lever connected to the wing.

8. In a traveling line-carriage of a monoline-machine, the combination of the main frame of the carriage adapted to travel on a guide-rail, a stationary jaw connected to and forming part of the carriage, a movable wing sleeved in the carriage, a spring connected to the wing and adapted to throw it out of engagement with the line of matrix-bars in the carriage, a lever connected to the swinging wing to throw the wing into engagement with the line of matrix-bars, a hook or latch adapted to hold the lever in locked position, a trip-lever connected to said hook or latch having a finger thereon, means movable in the path of the finger and adapted to engage said finger and throw the lever to unlatch the lever or arm connected to the wing to permit the wing to swing out of engagement with the line of type.

9. In a traveling line-carriage of a monoline-machine, the combination of the main frame of the carriage adapted to travel along a guide-rail, a removable jaw rigidly attached to and forming a part of the carriage sleeved on a guide-rod, the upper part of the said carriage being also sleeved to the guide-rod, a hub encircling the guide-rod and extending through the upper end of the carriage, a movable wing connected to the hub, a spring connected to the hub and adapted to throw the wing out of engagement with the line of matrix-bars held in the carriage, a lever connected to the other end of the hub to which is attached a lever or arm by which the wing is thrown into engagement with the line of matrix-bars, a detent on the end of said lever, a lever pivoted to the frame and having a catch or hook adapted to engage the detent of the lever to hold the lever in locked position, another lever connected to the carriage in operative engagement with the lever carrying the hook, said lever having a finger on the end thereof, means connected to the frame of the depressor in the path of the finger and adapted to engage said finger to move the lever to disengage the hook from the above-mentioned detent so as to release the arm connected to the hub on which the wing is connected to permit the wing to be thrown by the spring out of engagement with the line of matrix-bars.

10. In a monoline-machine, the combination with the line-carriage, a stationary alining-bar on which a line of matrix-bars may be assembled, a traveling alining-bar movable to and from said line by the movement of the line-carriage.

11. In a monoline-machine, the combination with the line-carriage, a stationary alining-bar on which may be assembled a line of matrix-bars of a traveling alining-bar movable to and from the line of matrix-bars in a horizontal plane above said stationary bar by the movement of the carriage to engage and support the line as it moves with the line-carriage.

12. In a monoline-machine, the combination of a traveling line-carriage, a stationary alining-bar on which a line of matrix-bars may be assembled, of a traveling alining-bar movable to and from the line by a longitudinal movement of the carriage.

13. In a monoline-machine, the combination of a stationary alining-bar on which may be assembled a line of matrix-bars, a slide above said bar, a traveling alining-bar above the slide and connected thereto, a connection between the line-carriage and slide so that when the carriage moves the slide is moved to throw the traveling alining-bar in or out of engagement with the line of matrix-bars.

14. In a monoline-machine, the combination of a stationary alining-bar on which may be assembled a line of matrix-bars, a traveling carriage, a slide connected to said carriage, a traveling alining-bar above said slide, and means by which the slide and traveling alining-bar are connected by which the traveling alining-bar is thrown in or out of engagement with the line of matrix-bars when the slide travels with the carriage.

15. In a monoline-machine, the combination of a stationary alining-bar on which a line of matrix-bars may be assembled, having notches thereon adapted to be engaged by said stationary alining-bar, a traveling carriage, a slide above said alining-bar and connected to the carriage, pins projecting from said slide, a traveling alining-bar above said slide having inclined slots in which said pins project, a traveling alining-bar moving with the slide, means in the path of movement to engage the traveling alining-bar to arrest its movement with the slide temporarily and permit it to be thrown into or out of engagement with the said line of matrix-bars.

16. In a monoline-machine, the combination of a stationary alining-bar on which a line of matrix-bars may be assembled, having notches thereon adapted to be engaged by said stationary alining-bar, a traveling carriage, a slide above said alining-bar and connected to the carriage, pins projecting from said slide, a traveling alining-bar above said slide having inclined slots in which said pins project, a traveling alining-bar moving with the slide, detents in the path of travel of the movable alining-bar and adapted to momentarily arrest its movement with the slide to permit the pins moving in said slots in the traveling alining-bar to throw said bar into or out of engagement with the matrix-bars.

17. In a monoline-machine, the combination of a stationary alining-bar on which a line of matrix-bars may be assembled, having notches thereon adapted to be engaged by said stationary alining-bar, a traveling carriage, a slide above said alining-bar and connected to the carriage, pins projecting from said slide, a traveling alining-bar above said slide having inclined slots in which said pins project, a traveling alining-bar moving with the slide, spring-detents in the path of travel of the movable alining-bar and adapted to momentarily arrest its movement with the slide to permit the pins moving in said slots in the traveling alining-bar to throw said bar into or out of engagement with the matrix-bars.

18. In a monoline-machine, the combination of a traveling carriage alining-bar rail, a stationary alining-bar connected to said rail having longitudinal grooves therein, a stationary alining-bar connected to said rail, a slide above said stationary alining-bar and adapted to travel in the longitudinal grooves in the rail, a line-carriage connected to said slide, pins projecting above said slide, a traveling alining-bar above the slide having longitudinal slots therein into which the pins project, a detent on said rail in the path of travel of the traveling alining-bar and adapted to strike the end of the said bar to momentarily stop its travel with the slide and to permit it to be forced into engagement with the matrix-bars by means of a pin-and-slot connection, a detent also mounted in the path of travel of the bar to throw the traveling alining-bar out of engagement with the matrix-bars on the return travel of the carriage.

19. In a monoline-machine, the combination of an alining-bar having longitudinal slots and a groove therein, a slide traveling in said grooves, a line-carriage, a pin traveling in said slot and connecting the slide and the carriage, pins projecting from the slide, a traveling alining-bar in contact with and movable with the slide having inclined slots into which said pins project, means in the path of travel of the traveling alining-bar to momentarily arrest its travel with the slide so that the said slide will move to and from the line of matrix-bars to engage or disengage said bars.

20. In a monoline-machine, a depressor, a justifier connected to the depressor and operated by means which also operate the depressor in front of the casting-pot.

21. In a monoline-machine, vertical reciprocating bars, a depressor connected to the upper ends of said bars, a justifier connected to the lower end of said bars and means for reciprocating said bars.

22. In a monoline-machine, a plate located on the machine in front of the casting-pot, vertically-reciprocating bars moving in said plate, a depressor connected at the top of said bars, a justifier connected at the lower end of said bars and means for raising and lowering the justifier to justify a line of type located in front of said plate and means adapted to lower the depressor to pull down the line of matrix-bars after the line of type has been cast and the matrix-bars released.

23. In a monoline-machine, the combination of a plate located in front of a casting-pot on the machine, vertically-reciprocating bars moving in said plate, a depressor connected to the upper end of said bars, a justifier connected at the lower end of said bars, a drive-shaft, a cam on said drive-shaft having depressions and a projection, levers between the cam and the justifier the end of one of the levers being in contact with the cam and adapted to enter the depressions and to be raised by the projection on the cam and to operate the justifier and depressor.

24. In a monoline-machine, the combination of a plate located opposite the casting-pot on the machine, vertically-reciprocating bars moving in said plate, a depressor connected to the upper end of said bars, a justifier connected at the lower end of said bars, a lever pivoted to the bed of the machine one end being connected to the justifier, another lever pivoted to the bed of the machine and connected to the first-mentioned lever, a spring adapted to pull that end of the lever to which it is connected, a roller connected to the other end of the lever, a cam having recesses therein into which the roller enters to permit the justifier to be raised to justify a line of matrix-bars in front of the casting-pot, the said cam also having a cam projection adapted to raise the lever, to lower the depressor, to pull down the matrix-bars after the line of type has been cast and the bars released.

25. In a monoline-machine, a distributer consisting of a series of plates adapted to receive the matrix-bars and spacers after the line has been cast and carry them to their appropriate chambers, and means for moving said plates first vertically and then substantially in the arc of a circle, as and for the purposes set forth.

26. In a monoline-machine, a distributer consisting of a series of plates adapted to receive the matrix-bars and spacers after the line has been cast and carry them to their appropriate chambers, and means for moving said plates first vertically and then substantially in the arc of a circle, and at the same time move their ends out of a vertical line.

27. In a monoline-machine, a distributer consisting of a series of plates adapted to receive the matrix-bars and spacers after the line has been cast and carry them to their appropriate chambers, a vertical reciprocating guide having longitudinal grooves in which the said plates move, means for lowering said guide and also means for forcing the plates forward as they descend so that they will move substantially in the arc of a circle.

28. In a monoline-machine, a distributer consisting of a series of plates adapted to receive the matrix-bars and spacers after the line has been cast and carry them to their appropriate chambers, a vertical reciprocating cross-head having grooves in which the plates longitudinally move, means for raising said cross-head and means for moving the plates backward out of vertical line with each other beginning with the lower plate as said plates are raised so that they move first vertically and then in substantially the arc of a circle from their lowest point to their raised position.

29. In a monoline-machine, a distributer consisting of a series of plates adapted to receive the matrix-bars and spacers after a line has been cast and carry them to their appropriate chambers, a vertical reciprocating cross-head having longitudinal grooves therein in which the plates longitudinally move, a lever connected to said cross-head and adapted to raise and lower the plates, means connected to said plates to move the forward end thereof in or out of alinement with each other, a lever for operating said means and adapted or arranged so that as the plates are raised and lowered the forward end of each plate will move first vertically and then in substantially the arc of a circle.

30. In a monoline-machine, a distributer consisting of a series of plates adapted to receive the matrix-bars and spacers after a line has been cast and carry them to their appropriate chambers, a guide connected to the bed of the machine, a vertical reciprocating cross-head moving in said guide, said cross-head having longitudinal parallel slots in which the plates move, a lever connected to the cross-head adapted to raise and lower said cross-head, the said plates having longitudinal slots therein of different length, a finger projecting in said slots, a lever connected to said finger adapted to push the cross-head forward and down when said lever is turned on its pivot so that when the cross-head is raised and lowered the ends of the plates will be moved into or out of vertical line with each other in substantially the arc of a circle.

31. In a monoline-machine, a traveling line-carriage, a wing mounted on said carriage and adapted to rock or swing up against the line of matrix-bars in the carriage to hold the line in the carriage, a depressor, and means adapted to be engaged by the depressor for swinging the wing out of engagement with the line of matrix-bars in the carriage to release the bars before the depressor operates to depress said matrix-bars.

32. In a monoline-machine, the combination of a traveling carriage, an arm connected to said carriage and carrying a movable wing adapted to hold a line of matrix-bars in the carriage in position, a lever pivoted to the said carriage and coacting with said arm to hold it in locked position, a depressor, means for moving the depressor to cause it to strike said lever to release the arm to permit the wing to be thrown out of engagement with the matrix-bars to rock the same before the depressor operates to depress the line of bars.

33. In a monoline-machine, the combination, of a lever having an arm connected thereto and carrying a wing to hold the line of matrix-bars in position, a lever pivoted to said carriage having a hook to hold the arm in locked position and an end to positively bear against the arm to push it out of locked position, another lever pivoted to said carriage and connected to the first-named lever having a finger, a depressor, means between the depressor and the finger whereby the finger is moved down to unlock the arm when the depressor is lowered to move the wing to release the matrix-bars.

34. In a monoline-machine, the combination, of a traveling line-carriage, a sleeve in said carriage, an arm 21 connected to said sleeve, a wing 20 also connected to said sleeve, a lever 22 pivoted to said carriage having the latch 23 and end 22ª, another lever 25 pivoted to said carriage and connected to lever 22, the said lever 25 having a finger 26, a depressor, means connected with said depressor and adapted to strike the finger 26 to operate the levers 25 and 22, arm 21, and wing 20 in a manner substantially as shown and described.

35. In a monoline-machine, the combination, with a traveling line-carriage, an arm 21 connected to said carriage to operate a wing 20, a lever 22 pivoted to said carriage having a hook 23 which engages with the arm 21, and an end 22ª which also engages with arm 21, another pivoted lever 25 connected to said lever 22 having a finger 26, a depressor, a justifier connected with said depressor, the under side of said justifier being in engagement with the finger 26 when the depressor is lowered, whereby the finger is pushed down and the levers 25 and 22 are operated to disengage the arm 21 and to throw it away from the machine to lower the wing, whereby the line of matrix-bars are released before the depressor operates on said bars to push them in a lower position after the line of type has been cast.

In testimony whereof I affix my signature in the presence of two witnesses.

WILLIAM WALLACE WOTHERSPOON.

Witnesses:
H. M. SEAMANS,
C. P. ROBINSON.